June 6, 1939.　　　　　　J. F. JOY　　　　　　2,161,547
MATERIAL HANDLING APPARATUS
Filed Aug. 4, 1937　　　　　8 Sheets-Sheet 3
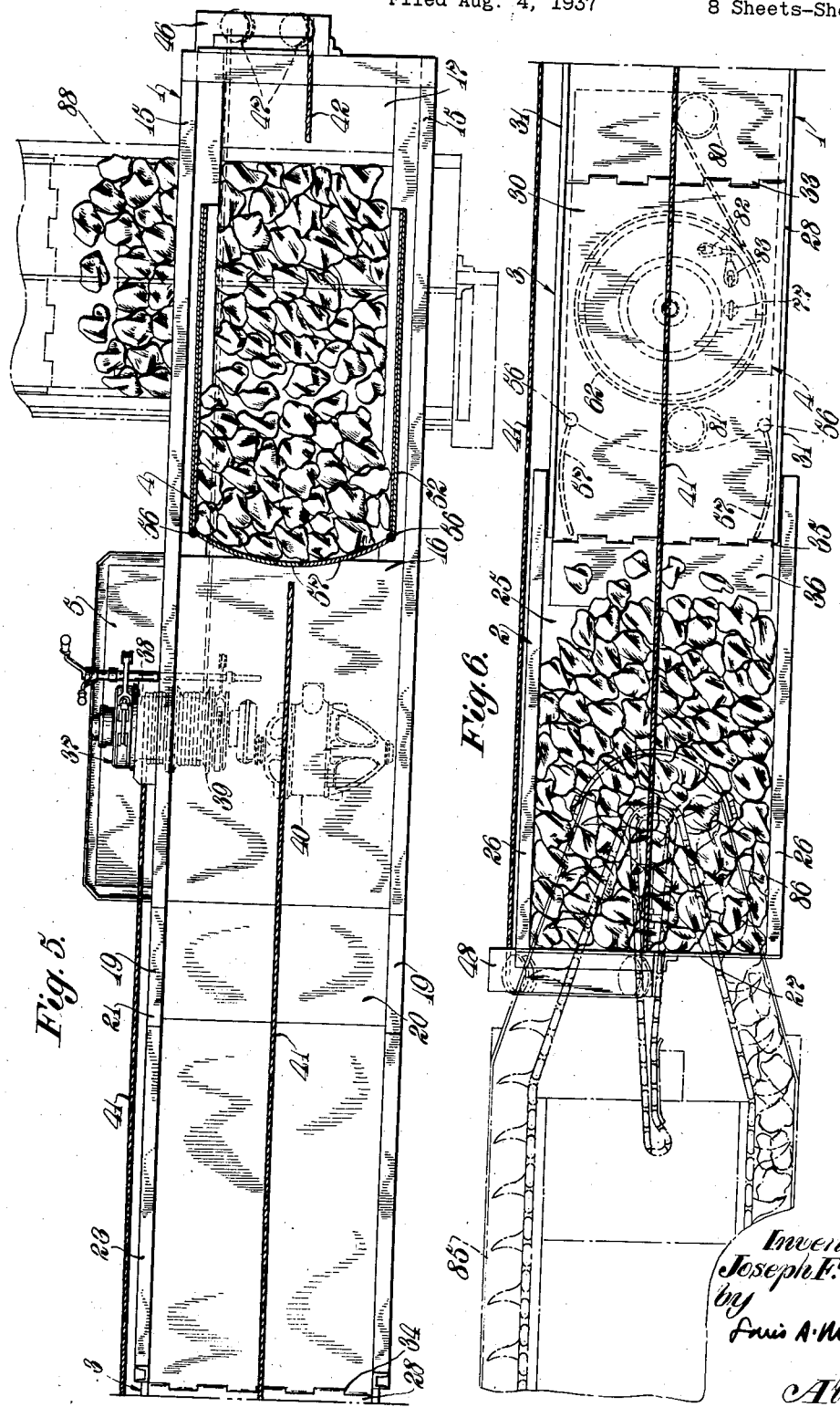

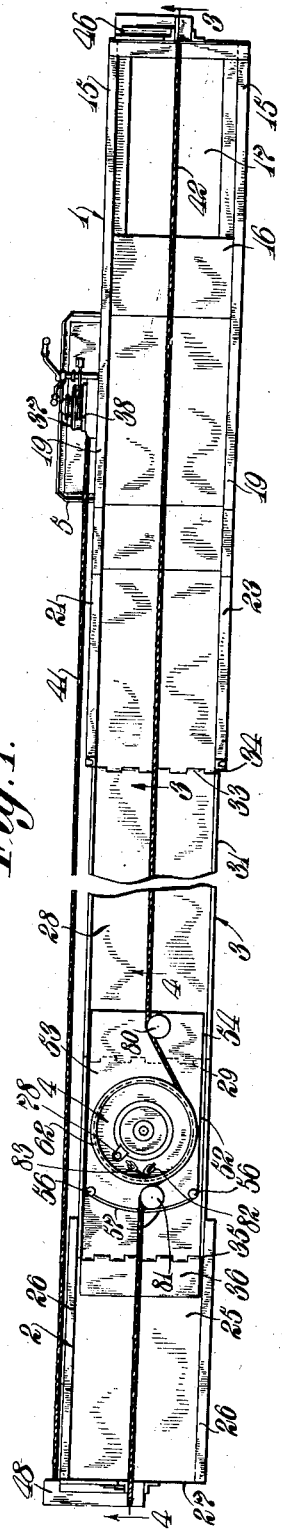

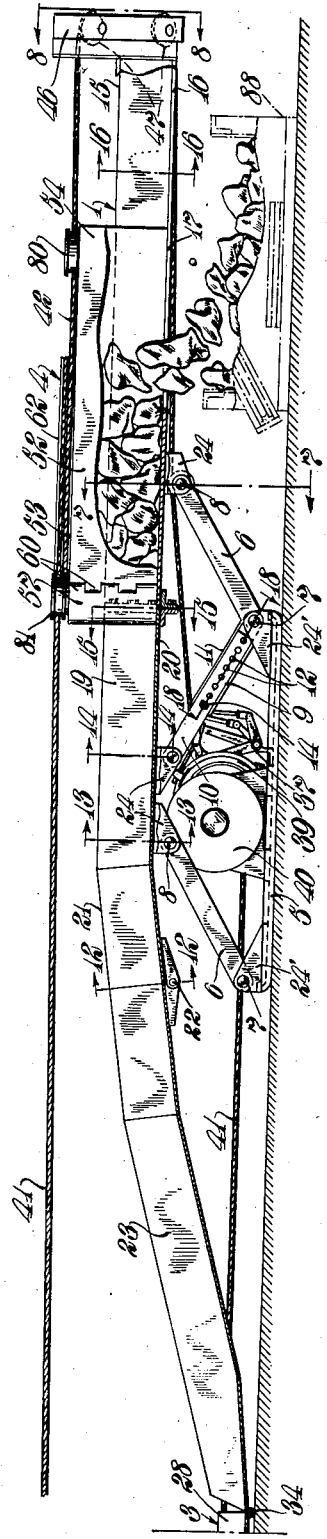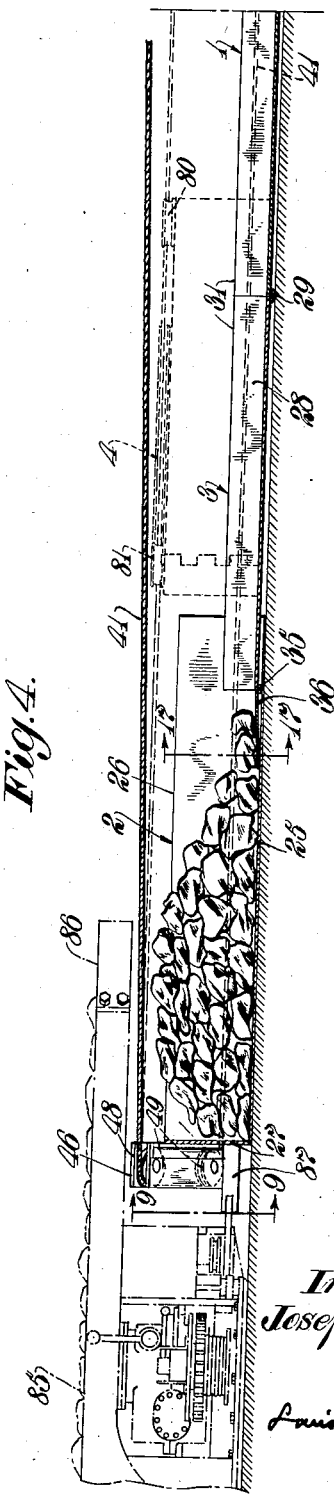

Inventor:
Joseph F. Joy.
by
Louis A. Maxson
Atty.

June 6, 1939.　　　　　J. F. JOY　　　　　2,161,547
MATERIAL HANDLING APPARATUS
Filed Aug. 4, 1937　　　8 Sheets-Sheet 5
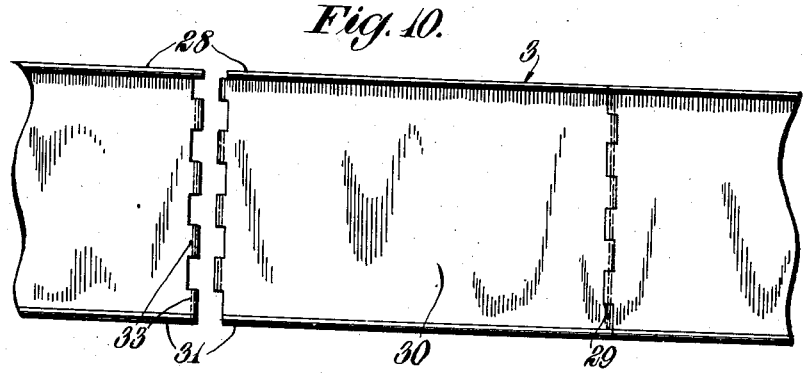
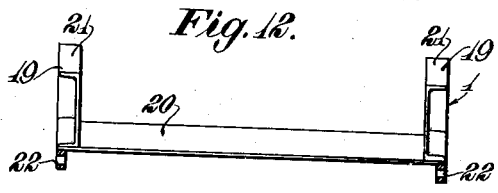
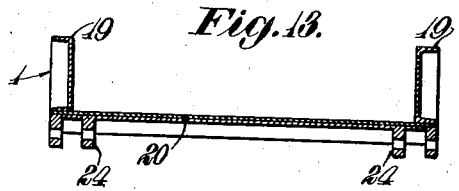
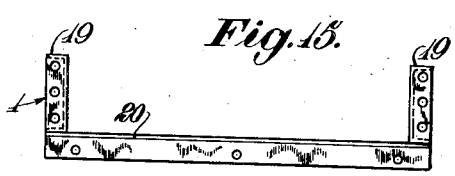
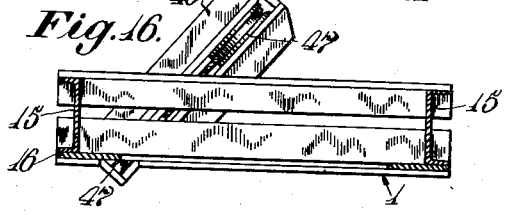
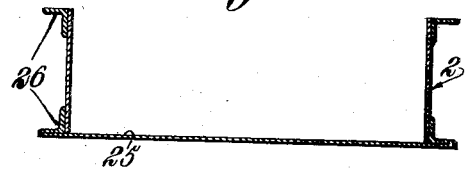
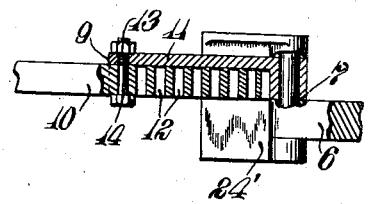
Inventor:
Joseph F. Joy.
by
Louis A. Maxson.
Att'y.

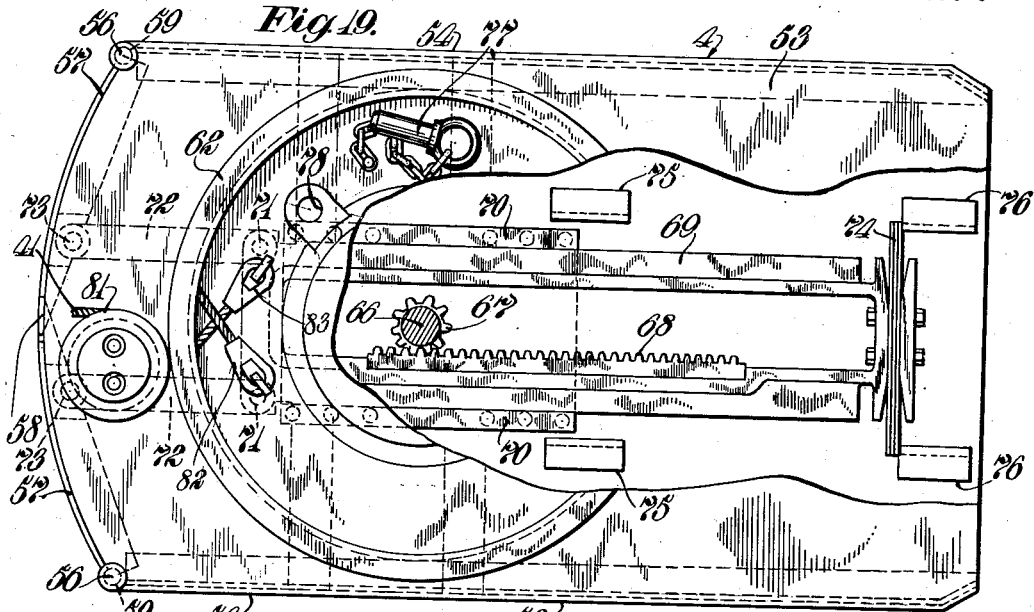
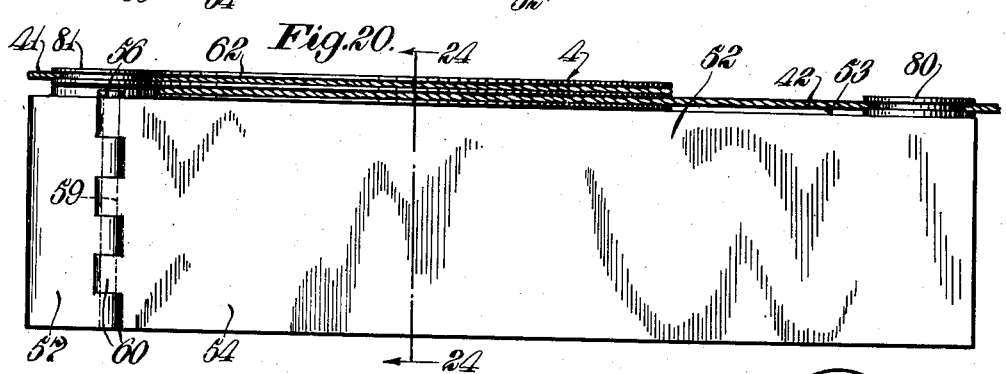
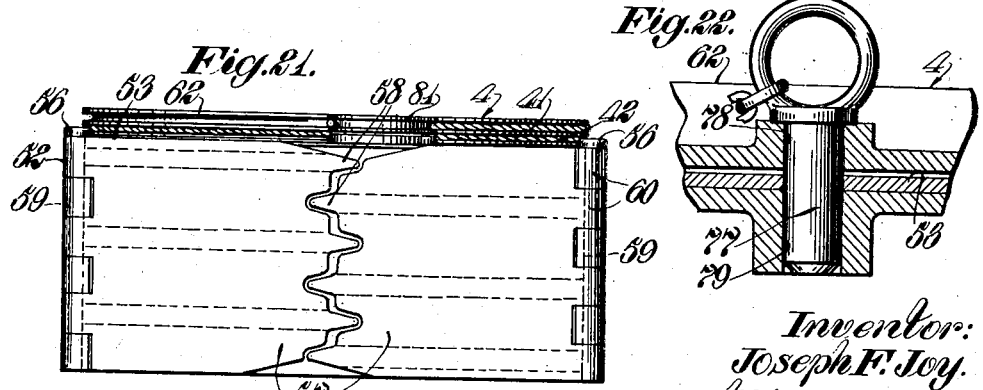

June 6, 1939.   J. F. JOY   2,161,547
MATERIAL HANDLING APPARATUS
Filed Aug. 4, 1937   8 Sheets-Sheet 7
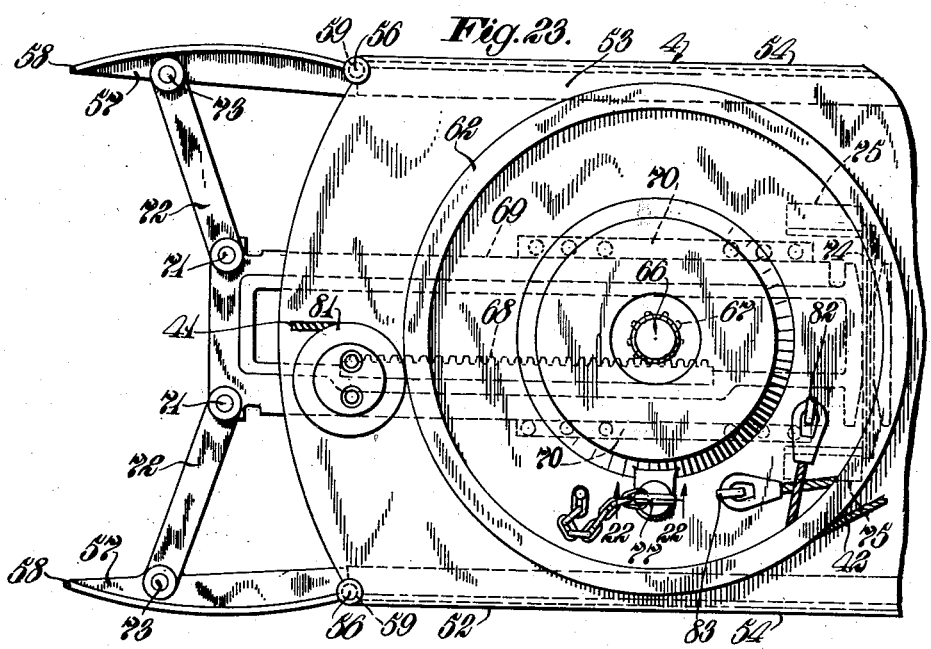
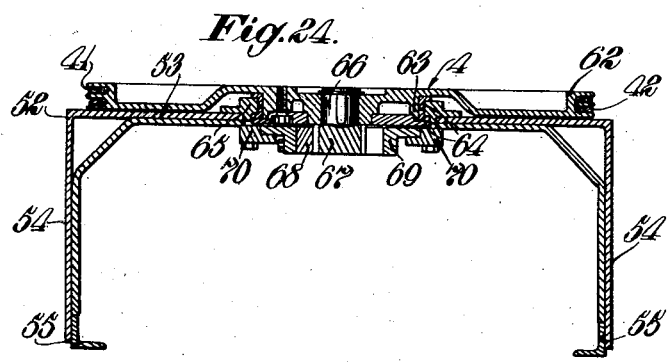
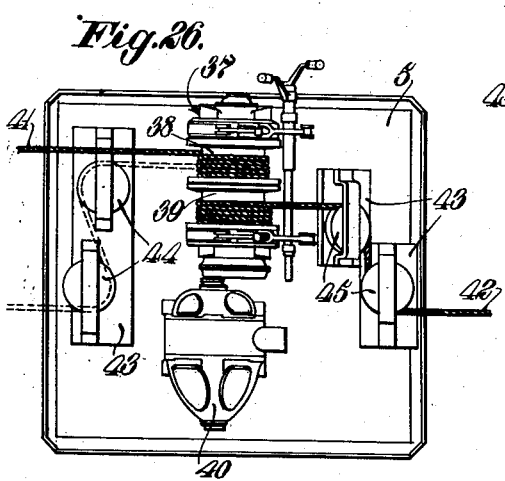
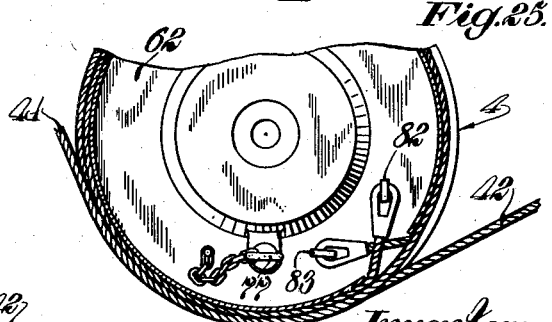
Inventor:
Joseph F. Joy
by
Louis A. Uraxm.
Atty.

June 6, 1939. J. F. JOY 2,161,547
MATERIAL HANDLING APPARATUS
Filed Aug. 4, 1937 8 Sheets-Sheet 8
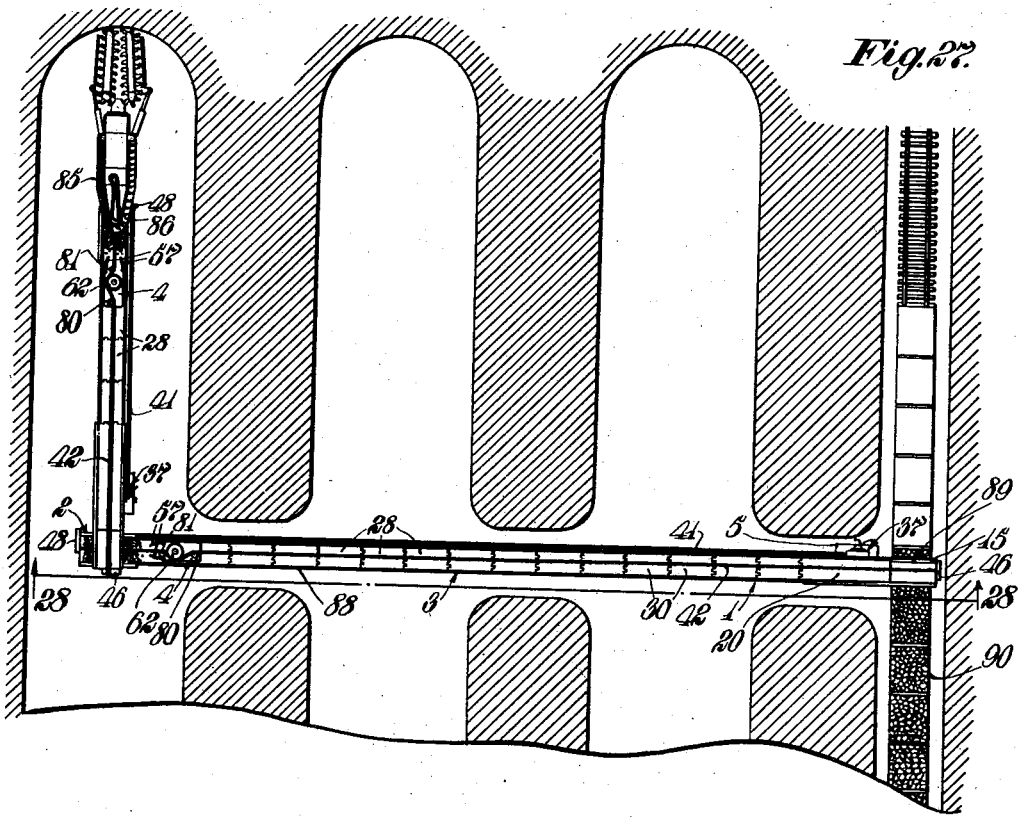
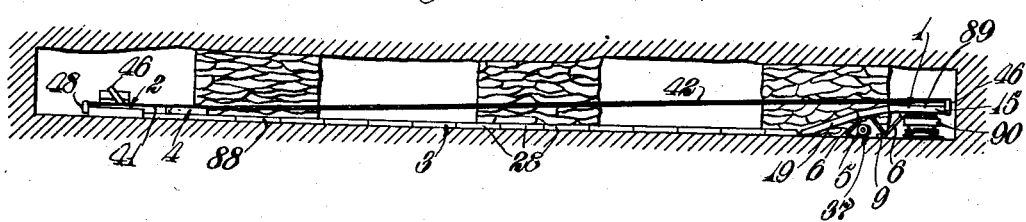
Inventor:
Joseph F. Joy.
by
[signature]
Att'y.

Patented June 6, 1939

2,161,547

UNITED STATES PATENT OFFICE 2,161,547

MATERIAL HANDLING APPARATUS

Joseph F. Joy, Claremont, N. H., assignor to Sullivan Machinery Company, a corporation of Massachusetts Application August 4, 1937, Serial No. 157,367

21 Claims. (Cl. 214—110)

This invention relates to material handling apparatus, and more particularly, but not exclusively, to improvements in a drag line operated transfer apparatus for handling loose material in mines.

An object of the present invention is to provide an improved apparatus for handling loose material. Another object is to provide an improved drag line transfer apparatus particularly designed to use in handling loose material in mines. A further object is to provide an improved transfer apparatus embodying a storage receptacle, a transfer or loading slide, means intervening between the storage receptacle and slide for providing a guideway therebetween, and improved transfer means movable back and forth along said guideway for transferring the material from said storage receptacle to an elevated discharge position on the slide. A further object is to provide an improved loading slide having embodied therein haulage means for moving the transfer means along its guideway. Yet another object is to provide a series of articulated transfer pans for providing a guideway for the transfer means. Yet another object is to provide an improved scraper loader mechanism having embodied therein an improved scraper and improved means for moving and guiding the scraper during transfer of the material to be loaded. A still further object is to provide an improved scraper mechanism having improved material penetrating and gathering means and improved means for moving the latter into and out of penetrating and gathering position. A further object is to provide an improved handling apparatus which is extremely low in height, well adapted to use in low vein mines wherein the head room is relatively restricted. Other objects and advantages of the invention will, however, hereinafter more fully appear.

In the accompanying drawings there is shown for purposes of illustration one form which the invention may assume in practice.

In these drawings:

Fig. 1 is a top plan view of a material handling apparatus constructed in accordance with an illustrative embodiment of the invention.

Fig. 2 is a side elevational view of the material handling apparatus shown in Fig. 1.

Fig. 3 is an enlarged view in longitudinal vertical section taken substantially on line 3—3 of Fig. 1, parts being shown in elevation to facilitate illustration.

Fig. 4 is an enlarged view in longitudinal vertical section taken substantially on line 4—4 of Fig. 1.

Fig. 5 is an enlarged plan view of the transfer or loading slide.

Fig. 6 is an enlarged plan view showing the storage receptacle together with the associated transfer means.

Fig. 10 is a plan view showing certain of the transfer pans, one pan being separated from the others to show the hinge connection.

Fig. 11 is an end elevational view of one of the transfer pans.

Fig. 12 is a cross sectional view taken on line 12—12 of Fig. 3.

Fig. 13 is a cross sectional view taken on line 13—13 of Fig. 3, with parts omitted.

Fig. 14 is a cross sectional view taken on line 14—14 of Fig. 3, with parts omitted.

Fig. 15 is a detail view taken in the plane of line 15—15 of Fig. 3.

Fig. 16 is a detail cross sectional view taken on line 16—16 of Fig. 3.

Fig. 17 is a cross sectional view taken on line 17—17 of Fig. 4, with parts omitted.

Fig. 18 is a detail sectional view taken on line 18—18 of Fig. 3.

Fig. 19 is a plan view of the improved transfer scraper, the top plate being broken away to illustrate structural details.

Fig. 20 is a side elevational view of the transfer scraper shown in Fig. 19.

Fig. 21 is an end elevational view of the scraper shown in Figs. 19 and 20.

Fig. 22 is a detail sectional view taken on line 22—22 of Fig. 23.

Fig. 23 is a fragmentary plan view of the transfer scraper shown in Fig. 19, with the material penetrating and gathering means in material penetrating position.

Fig. 24 is a cross sectional view taken on line 24—24 of Fig. 20.

Fig. 25 is a sectional view showing the actuating pulley or sheave for the material penetrating and gathering mechanism.

Fig. 26 is a plan view of the bottom skid with the super-structure removed, illustrating the haulage mechanism and the associated cable guides.

Fig. 27 is a diagrammatic plan view showing the method of use of the improved material handling apparatus in a mine.

Fig. 28 is a vertical sectional view taken substantially in the plane of line 28—28 of Fig. 27.

Figure 7:
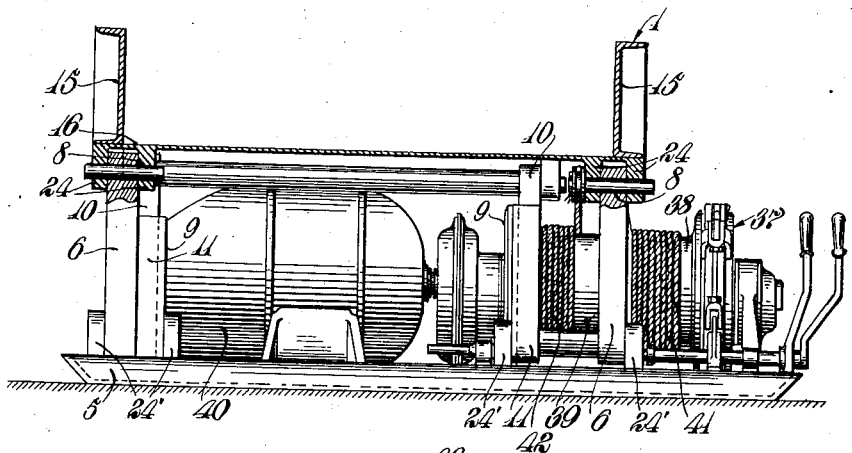
Fig. 7 is an enlarged cross sectional view taken substantially on line 7—7 of Fig. 3, with parts omitted.

In this illustrative embodiment of the invention, there is shown a material handling apparatus particularly adapted to use in mines for transferring loose material from a point near the working face to a suitable point of disposal, and is herein of portable type adapted to rest upon and slide over the mine floor. It will be evident, however, that various features of the invention may be embodied in material handling apparatus of various other types, and the apparatus, under certain conditions, may be track mounted or tractor tread supported and guided.

The apparatus disclosed herein, as shown in the drawings, specifically comprises a transfer or loading slide generally designated 1, a storage receptacle or front pan 2, a guide structure 3 intervening the storage receptacle and loading slide and providing a transfer guideway therebetween, and transfer means generally designated 4 movable back and forth along the guideways between the storage receptacle and loading slide for penetrating and gathering a portion of the material contained in the storage receptacle and moving the material along the guideways of the guide structure into an elevated discharge position on the loading slide. The transfer or loading slide 1, in this instance, comprises a bottom skid plate 5 having adjustably mounted thereon a superstructure providing guideways along which the transfer means 4 is movable during elevation of the material to be transferred into its discharge position on the loading slide. This superstructure is preferably supported on the bottom skid by means of parallel supporting arms 6, 6 pivotally mounted at 7 on the skid and pivotally connected at 8 to the bottom of the super-structure. A pair of adjustable members 9, in the form of extensible struts or links, are pivotally connected at their ends to the bottom skid and the super-structure respectively and comprise, as shown in Fig. 18, cooperating relatively adjustable parts 10 and 11, the upper parts having a series of openings 12 with which openings 13 in the lower parts are registerable; and clamping bolts 14 receivable in the registering openings in the parts are adapted firmly to clamp the parts together in adjusted position. It will thus be seen that by adjusting the extensible struts or links, the parallel arms 6, 6 may be swung about their pivots relative to the bottom skid to vary the elevation of the slide super-structure and may be thereafter held in adjusted position by the strut clamping bolts. By adjusting the elevation of the slide super-structure, the material can be discharged onto conveyors or into mine cars of different height.

The slide super-structure comprises, as shown in Figs. 3 and 5, a pair of horizontal channel members 15 (see also Fig. 16), rigidly secured in parallel relation by a bottom plate 16. These members provide a slide portion which overhangs a substantial distance the rear end of the bottom skid, and the bottom plate is formed with a bottom discharge opening 17 through which the material transferred onto the slide is discharged. The channel members 15 are detachably secured, in end abutting relation, at 18, as by bolts, to alined channel members 19, 19, rigidly secured together by a bottom plate 20 (see also Fig. 15) and herein forming a forward continuation of the rear overhanging slide portion. By the provision of the joint between the front and rear sections of the super-structure, the rear section may be detached during transport of the apparatus to facilitate movement of the apparatus through the relatively restricted mine passageways. The forward ends of the front channel members are downwardly inclined at 21 and have pivotally connected thereto on a horizontal axis at 22, at their forward ends, an inclined slide frame 23, likewise composed of side channel members secured together by a bottom plate, and this pivoted front frame cooperates with the rear frame section to provide guideways for the transfer means 4, as will later be explained. Secured to the bottom plate of the super-structure of the loading slide are bearing brackets 24 providing the pivots for the upper ends of the supporting arms 6 and the adjusting struts 9, and similar bearing brackets 24' are secured to the top of the bottom skid plate for providing the pivots for the lower ends of the arms and struts, in the manner shown in Fig. 3.

As shown most clearly in Figs. 1, 2 and 6, the storage receptacle 2 comprises a rectangular pan section having a hopper-like storage chamber and composed of a bottom plate 25 having vertical side frames 26, 26 reinforced as by angle members, and a front end closure plate 27, the bottom plate and side frames being open at their rear ends to permit the entrance of the transfer means 4 within the storage chamber of the receptacle.

The guiding structure 3 intervening the storage receptacle 2 and the loading slide comprises a series of articulated transfer pans 28 pivotally connected together at 29 on horizontal, transversely extending axes, and each comprises, as shown in Fig. 10, a bottom plate 30 and vertical side plates 31. The adjacent ends of the transfer plates are provided with perforated lugs 33 adapted to interfit with similar lugs on the next adjacent plate, and when the openings in the lugs are alined, a suitable pivot pin is inserted therethrough, thereby providing an extremely compact, dovetailed hinge structure for the pans. These articulated transfer pans are pivotally connected at 34 to the lower outer end of the slide frame 23 of the loading slide and at 35 to a slide plate 36 freely slidingly engaging the bottom of the storage receptacle 2. The smooth bottom surface of the storage receptacle and articulated transfer plates and the bottom skid plate of the loading slide and the hinged connection between the parts, enable the apparatus to be moved readily over an uneven or undulating mine floor. It is clearly evident that when it is desired to increase the length of or to shorten the guiding structure 3, pans may be either inserted therein or removed therefrom in an obvious manner.

Figure 8:
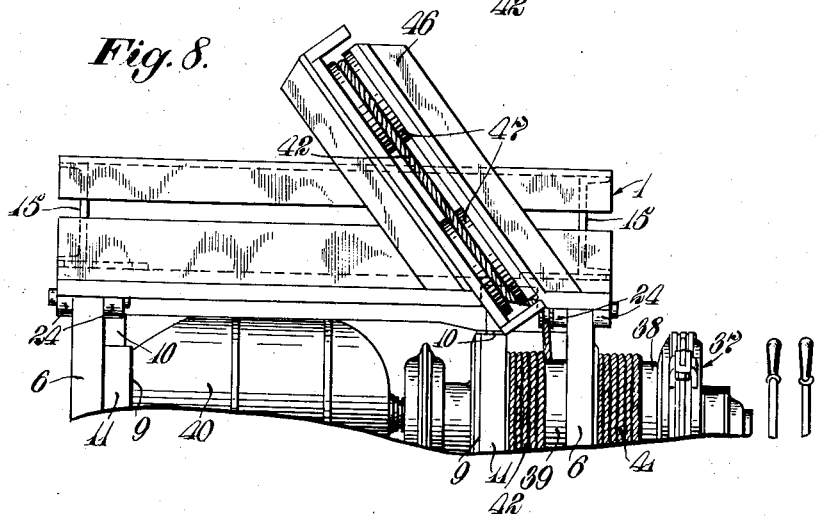
Fig. 8 is an enlarged detail sectional view taken on line 8—8 of Fig. 3.
Figure 9:
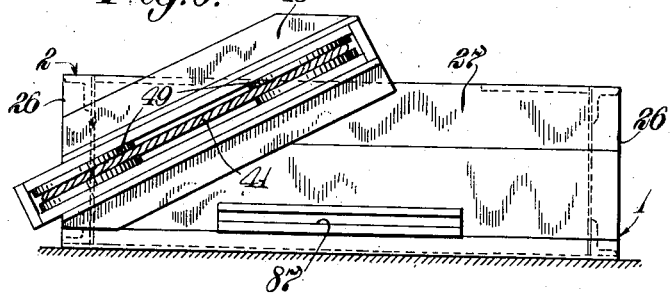
Fig. 9 is a detail cross sectional view taken on line 9—9 of Fig. 4.

Again referring to the improved loading slide 1, it will be noted that supported on the bottom skid 5 beneath the slide super-structure is a haulage mechanism, generally designated 37, comprising relatively rotatable haulage drums 38 and 39 driven by a motor 40 and having respectively wound thereon a drag line, herein comprising tail and haulage ropes or cables 41 and 42. Secured to the bottom skid plate are brackets 43, on which are journaled guide sheaves 44, by which the tail rope 41 is adapted to be guided, and similar guide sheaves 45 are provided for the haulage rope 42. The cables 41 and 42 may be extended around their respective guide sheaves 44 and 45 to a suitable anchor extraneous to the apparatus, so that when one cable or the other is wound in, the loading slide may be moved bodily over the mine floor in one direction or the other as desired. The cables may also be used in sliding the transfer pans over the mine floor when it is desired to insert additional pans in the guide structure. Supported on the rear overhanging end portion of the slide structure of the loading slide is an inclined bracket 46 (see Fig. 8), having journaled thereon guide sheaves 47, while supported on the front end of the storage receptacle or front pan 2 is an inclined bracket 48, on which are journaled similar guide sheaves 49, and these guide sheaves guide the haulage and tail ropes of the drag line which operates the transfer means 4, in a manner to be later described.

The transfer means 4 is in the form of a scraper mechanism comprising a box-like scraper frame 52 having a horizontal top 53 and vertical sides 54, the latter being supported on angle members 55 providing bottom side runners adapted to slide along the guideways provided by the transfer pans and slide structure of the loading slide. The scraper frame is open at its bottom and is provided with front and rear open ends, and pivotally mounted on vertical axes at 56 on the vertical sides of the scraper frame near the open forward end thereof are cooperating horizontally swingable, penetrating and gathering elements 57, 57. These penetrating and gathering elements are herein of claw-like form having teeth 58 on the upright penetrating edges thereof for facilitating penetration of the material to be transferred. These claw-like elements are pivotally mounted on vertical pivot pins 59 fitted within registering openings in interfitting lugs 60 on the claw-like elements and scraper frame respectively. Mounted on the top of the scraper frame is a large horizontal grooved pulley 62 having its hub 63 journaled within bearing sleeves 64 supported by an annular bearing support 65 fixed to the top of the scraper frame. The hub of the pulley 62 is keyed to a vertical shaft 66 having secured thereto a spur gear 67 meshing with the teeth of a rack 68. This rack is secured to a sliding frame 69 guided for axial movement within longitudinal guideways 70, 70 fixed beneath the top of the scraper frame. Pivotally connected at 71 to the front end of the slide 69 are links 72, 72 in turn pivotally connected at 73 to the claw-like elements 57. Supported on the rear end of the slide 69 is a resilient stop 74 of spring-like form, and this stop is engageable with abutments 75 and 76 secured beneath the top of the scraper frame, in the opposite positions of the slide. When the stop 74 is against the front abutment 75, it can be locked in position by a locking pin 77 (see Fig. 22) insertable within registering openings 78 and 79 in the pulley and scraper frame respectively, so that the slide may be readily locked against sliding movement. When the slide is locked to the scraper frame, rotation of the pulley 62 is prevented, and as a result the scraper may be moved bodily while the penetrating and gathering elements 57, 57 are maintained in their open position, thereby enabling movement of the transfer scraper back and forth within the transfer pans with the gathering elements in open position. As shown, journaled on the top of the scraper frame are horizontal guide sheaves 80 and 81, respectively located at the rear and in advance of the pulley 62. The tail rope 41 of the drag line of the haulage mechanism may be extended from its drum 38 in a forward direction longitudinally along one side of the transfer pans and storage receptacle, around the guide sheaves 49 on the front end of the storage receptacle and then rearwardly around the guide sheave 81 on the scraper frame, the free end of the cable being wrapped in one direction around the pulley 62 and fixed to the pulley at 82. The haulage rope 42 may be extended from its drum 39 rearwardly around the guide sheaves 47 at the rear end of the loading slide, then forwardly in parallelism with the tail rope 41 and around the guide sheave 80 on the scraper frame, the free end of the cable being wrapped in the opposite direction around the pulley 62 and fixed to the pulley at 83. When the tail rope 41 is wound in by its drum and the haulage rope 42 is paid out from its drum, the portion of the tail rope engaging the pulley 62 effects rotation of the latter, thereby moving the slide 69 forwardly relative to the then stationary scraper frame to swing the claw-like elements 57 from their closed position shown in Fig. 19 into their open penetrating position shown in Fig. 23. When the claw-like elements 57 are in their wide open position, the stop 74 on the slide engages the abutments 75 to prevent further outward swinging movement of the claw-like elements. Upon continued winding in of the tail rope 41, the transfer scraper is moved bodily in a forward direction along the guideways of the transfer pans and enters the storage receptacle 2, to cause the claw-like elements to penetrate the material stored within the storage receptacle. Upon operation of the haulage rope drum 39, the haulage rope is wound in, while the tail rope is paid out, thereby rotating the pulley 62 in the opposite direction to effect rearward sliding movement of the slide 69 relative to the then stationary scraper frame, to swing the claw-like elements inwardly from their open position shown in Fig. 23 to their closed position shown in Fig. 19, and upon continued winding in of the haulage rope, the transfer scraper is moved bodily rearwardly along the transfer pan guideways and upwardly along the guideways of the inclined loading slide into its discharge position shown in Figs. 3 and 5 on the top of the loading slide, wherein the material within the transfer scraper is discharged through the bottom discharge opening of the slide frame. The operations of opening the gathering elements, moving of the scraper mechanism bodily forwardly to penetrate the material, closing the gathering elements to grasp and retain the material and moving the scraper mechanism bodily rearwardly to drag the material to a suitable point of discharge, occur in rapid succession, and as the material is loaded, the material handling apparatus may be advanced toward the material to be loaded by the addition of transfer pans.

The improved material handling apparatus is particularly designed for use with a combined cutting and loading apparatus of the same general character as that described in my copending application Serial No. 143,309, filed May 20, 1937, although it will be evident that various other forms of loading apparatus may be associated therewith. In this particular construction, the rearward portion of the combined cutting and loading apparatus is indicated in construction lines at 85 in Figs. 4 and 6 and the complete apparatus is shown diagrammatically in plan in Fig. 27. The rear end of the discharge conveyor 86 of the cutting and loading apparatus overhangs the storage receptacle or front pan 2 of the material handling apparatus in the manner shown. The storage receptacle of the material handling apparatus may be connected to the base of the cutting and loading apparatus by suitable connections shown at 87 in Fig. 4. The combined cutting and loading apparatus comprises a pair of gangs of superimposed cutting and dislodging bars swingable horizontally completely to disintegrate the coal at the coal face, and embodies conveying means for receiving the dislodged coal and conveying the dislodged coal rearwardly of the apparatus to discharge into the storage receptacle 2 of the material handling apparatus. Arranged beneath the discharge end of the loading slide 1 of the material handling apparatus is a conveyor, indicated at 88 in construction lines in Fig. 3, and as the transfer scraper moves back and forth along the guideways of the transfer pans and loading slide, it gathers the material in the storage receptacle and moves the material so gathered along the transfer pans, upwardly along the inclined frame of the loading slide, into discharge position on the horizontal portion of the loading slide, the material discharging through the bottom of the scraper frame and the bottom discharge opening in the loading slide onto the conveyor 88, in the manner shown in Fig. 3. The conveyor 88 may be of any conventional form, such as a face conveyor, but, in this instance, comprises a material handling apparatus similar to that described above, and the loading slide 89 of the latter discharges the material into waiting mine cars 90 on the mine trackway in the entry of the mine, as shown in Figs. 27 and 28.

The general mode of operation of the improved material handling apparatus will be clearly apparent from the description given. The transfer or loading slide 1 may be moved over the mine floor into the desired loading position within the room by means of one or the other of the cables 41, 42 of the drag line, passing around certain of the guide sheaves 44, 45, in an obvious manner. When the loading slide is properly positioned within the room, the series of articulated transfer pans are connected thereto with the hinged slide plate 36 of the front pan freely slidingly engaging the bottom of the storage receptacle 2. The storage receptacle is then connected, by the connections 87, to the base frame of the combined cutting and loading apparatus 85 for movement therewith. The slide plate 36 of the front transfer pan, freely sliding engaging the bottom of the storage receptacle, provides for relative longitudinal movement between the storage receptacle and the front transfer pan during operation of the cutting and loading apparatus. The haulage and tail ropes are then extended around the guide sheaves 47 and 49 on the rear end of the loading slide and the forward end of the storage receptacle and passed around the guide sheaves 80 and 81 of the transfer scraper, the ends of the cables being wrapped around the pulley 62 and fixed to the pulley. The combined cutting and loading apparatus 85 is then operated to disintegrate the coal at the coal face and move the dislodged coal onto the conveying means of the apparatus, in the manner clearly described in the above mentioned copending application, and the coal is discharged from the apparatus by the rear conveyor 86 into the storage receptacle 2 of the material handling apparatus. The transfer scraper of the material handling apparatus is then operated by the drag line cables of the haulage mechanism 37 on the loading slide 1, and as the scraper is moved back and forth along the guideways of the transfer pans and loading slide, it penetrates and gathers the material within the storage receptacle and moves the material so gathered along the transfer pans upwardly along the inclined slide frame of the loading slide to its discharge position on the discharge end of the loading slide wherein the material is discharged onto the conveyor 88. The transfer scraper of the conveyor 88 is operated to move the material along the articulated transfer pans extending through the cross cuts between the rooms and discharges the material from the loading slide 89 into the waiting mine car 90 disposed on the mine trackway beneath the discharge end of the loading slide. If desired, additional combined cutting and loading apparatus and material handling apparatus may be located in the two adjacent rooms shown in Fig. 27, so that the coal faces of the rooms may be advanced simultaneously and the material transfer apparatus in the cross cuts may be of suitable capacity and length to handle the coal discharged thereto by the material handling apparatus in the different rooms. As the working faces in the different rooms are advanced, additional transfer pan sections may be added to the transfer guide structure.

As a result of this invention, it will be noted that an improved material handling apparatus is provided especially adapted to use in mines whereby the loose material may be readily moved away from the working face to a suitable point of disposal. It will also be evident that by the provision of the improved transfer structure, it is possible to load large quantities of loose material in places having relatively low headroom, such as in the low mine passages in a low-vein mine, the apparatus being extremely low in height. It will further be evident that by the provision of the articulated transfer pan structure and the particular structure of the storage receptacle and loading slide, the apparatus is rendered extremely flexible, thereby to enable movement thereof over an uneven mine floor or rough bottom, and, due to the sectional construction, the apparatus may be quickly dismantled for transport about the mine. Other uses and advantages of the improved material handling apparatus will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a material handling apparatus, in combination, a portable storage receptacle for receiving the material to be handled, a portable loading slide, a low compact portable guide structure extending between said receptacle and slide and providing a guideway therebetween, said receptacle, slide and guide structure adapted to rest upon and slide in any direction over a bottom supporting surface, and a transfer means guided on said guideway for reciprocable movement back and forth therealong for moving the material to be handled from said receptacle along said guide structure into a discharge position on said loading slide.

2. In a material handling apparatus, in combination, a portable storage receptacle for receiving the material to be handled, a portable loading slide, a low compact portable articulated pan structure extending between said receptacle and slide and providing a guideway therebetween, said receptacle, slide and guide structure adapted to rest upon and slide in any direction over a bottom supporting surface, and a transfer means guided on said guideway for reciprocatory movement back and forth therealong for moving said material to be handled from said receptacle along said pan structure into a discharge position on said loading slide.

3. In a material handling apparatus, in combination, a portable storage receptacle for receiving the material to be handled, a portable loading slide, a low compact guide structure extending between said receptacle and slide and providing a guideway therebetween, said receptacle, slide and guide structure adapted to rest upon and slide in any direction over a bottom supporting surface, a transfer scraper reciprocable back and forth along said guideway to move the material to be handled from said receptacle along said guide structure onto said slide, and a haulage mechanism mounted on said slide for reciprocating said scraper.

4. In a material handling apparatus, in combination, a portable front pan for receiving the material to be transferred, a portable loading ramp, a low compact portable guide extending between said front pan and said ramp and comprising a series of articulated guide pans, said front pan, loading ramp and articulated guide pans adapted to rest upon and slide in any direction over a bottom supporting surface, and a transfer device reciprocable back and forth along said guide pans for transferring the material from said front pan along said guide onto said loading ramp.

5. In a material handling apparatus, in combination, portable means for receiving the material to be transferred, portable means for elevating the material into its discharge position, low compact portable guide means extending between said receiving means and said elevating means and providing a guideway therebetween, said receiving means, elevating means and guideway-providing means adapted to rest upon and slide in any direction over a bottom supporting surface, and transfer means reciprocable back and forth along said guideway for transferring the material from said receiving means along said guideway-providing means into an elevated discharge position on said elevating means.

6. In a material handling apparatus, in combination, a portable loading receptacle, a portable loading slide, low compact portable means extending between said receptacle and slide and providing a guideway therebetween, said receptacle, slide and guideway-providing means adapted to rest upon and slide in any direction over a bottom supporting surface, a transfer device reciprocable back and forth along said guideway for moving the material to be handled from said receptacle along said guideway-providing means into a discharge position on said slide, and a haulage mechanism on said slide for reciprocating said transfer device, said haulage mechanism comprising a drag line cable and cable guides on the rear end of said slide and the front end of said receptacle.

7. In a material handling apparatus, in combination, a haulage mechanism, a scraper loader mechanism having relatively movable gathering means and means for moving said gathering means into and out of material gathering position, portable means providing a guideway for said scraper loader mechanism along which the latter moves during the loading operation, said guideway-providing means adapted to rest upon and move bodily over a bottom supporting surface, and flexible transmission connections operated by said haulage mechanism and operatively connected to said scraper loader mechanism for moving the latter along said guideway toward and from the material to be loaded, said flexible transmission connections operatively connected to said moving means for said gathering means for operating the latter, said transmission connections movable relative to said scraper loader mechanism, while the latter remains stationary as regards bodily movement with respect to said guideway, to actuate said gathering-means-moving means.

8. In a material handling apparatus, in combination, a portable storage receptacle, a portable loading slide, portable means extending between said receptacle and slide providing a guideway therebetween, said receptacle, slide and guideway-providing means adapted to rest upon and move bodily over a bottom supporting surface, a haulage mechanism comprising relatively rotatable cable winding drums, guide sheaves mounted on said storage receptacle and said slide respectively, cables wound on said drums and respectively passing around said guide sheaves on said receptacle and slide, a scraper movable along said guideway comprising a body for receiving the material, material penetrating means on said body for penetrating the material and moving and loading the material within the scraper body, and means for actuating said penetrating and moving means including a pulley on said scraper body, said cables engaging said pulley for rotating the latter.

9. In a material handling apparatus, in combination, a storage receptacle, a loading slide, means extending between said receptacle and slide providing a guideway therebetween, a haulage mechanism comprising relatively rotatable cable winding drums, guide sheaves mounted on said storage receptacle and said slide respectively, cables wound on said drums and respectively passing around said guide sheaves on said receptacle and slide, a scraper movable along said guideway comprising a body for receiving the material, material penetrating means on said body for penetrating the material and moving and loading the material within the scraper body, and means for actuating said penetrating and moving means including a pulley on said scraper body and engaged and rotated by said cables, the cables engaging said pulley moving relative to the scraper during movement of the penetrating and moving means into and out of penetrating position, and said scraper moving bodily with the cables when said penetrating means is in either open or closed loading position with respect to said scraper body.

10. In a material handling apparatus, in combination, a portable storage receptacle for receiving the material to be handled, a portable loading slide, low compact portable means extending between said receptacle and slide providing a guideway therebetween, said receptacle, slide and guideway-providing means adapted to rest upon and slide in any direction over a bottom supporting surface, a haulage mechanism comprising relatively rotatable cable winding drums, guide sheaves mounted on said storage receptacle and loading slide respectively, cables wound on said drums and respectively passing around said guide sheaves on said receptacle and slide, and a scraper reciprocable back and forth along said guideway and actuated by said cables for moving the material to be handled from said receptacle along said guideway-providing means onto said slide.

11. In a material handling apparatus, in combination, a haulage mechanism including cables and means for drawing in and paying out the same, a loading mechanism having a movably mounted gathering element, a portable guiding structure along which said loading mechanism is adapted to move, said guiding structure adapted to rest upon and move bodily over a bottom supporting surface, means for moving said gathering element into and out of its gathering position including a rotatable member mounted on said loading mechanism, guide sheaves at the opposite ends of said guiding structure for guiding the cables of said haulage mechanism, said rotatable member engaging the cables and rotated thereby, and means on said loading mechanism actuated by said rotatable member for moving said gathering element.

12. In a material handling apparatus, in combination, a haulage mechanism having relatively rotatable haulage drums and cables wound on said drums, a portable guiding structure providing a guideway, said guiding structure adapted to rest upon and move bodily over a bottom supporting surface, guide sheaves mounted at the opposite ends of said guiding structure and around which said cables pass for guiding said cables, a loading mechanism movable along said guideway and having a movably mounted material gathering element, and means for actuating said gathering element including a rotatable element mounted on said loading mechanism and operatively connected to said gathering element, the cables engaging said rotatable member of said loading mechanism for rotating said rotatable member.

13. In a material handling apparatus, in combination, a haulage mechanism, a portable guiding structure providing a guideway and adapted to rest upon and move bodily over a bottom supporting surface, guide sheaves mounted at the opposite ends of said guiding structure, cables extending from said haulage mechanism around said guide sheaves, a loading mechanism movable along said guideway including relatively movable material gathering means, and means for actuating said gathering means into and out of gathering position and for bodily moving said loading mechanism including a pulley mounted on said loading mechanism and engaged by said cables.

14. In a material handling apparatus, in combination, loading mechanism movable back and forth toward and from the material to be loaded and having material penetrating means movable with respect thereto for penetrating the material to be loaded and to move and retain the material within the loading mechanism, means adapted for actuation by the cables of a haulage mechanism for moving said material penetrating means into and out of material penetrating position, and releasable means for locking said material penetrating means either in its penetrating or material retaining position.

15. In a material handling apparatus, in combination, a loading mechanism movable back and forth toward and from the material to be loaded and having material penetrating means movable into a position for penetrating the material to be loaded and into a position to retain the material within the loading mechanism, means adapted for actuation by the cables of a haulage mechanism for moving said material penetrating means into and out of material penetrating position, and resilient stop means for limiting movement of said material penetrating means in either direction of movement thereof.

16. In a material handling apparatus, in combination, a scraper frame movable toward and from the material to be loaded, material penetrating means mounted on said frame and movable with respect thereto for penetrating the material to be loaded and to move and retain the material within the scraper frame, means adapted for actuation by the cables of a haulage mechanism for moving said material penetrating means into and out of material penetrating position with respect to said frame comprising a slide bar guided on said scraper frame for longitudinal movement in a direction lengthwise of said frame and actuating means operatively connected to said material penetrating means and actuated by said slide bar, and means for locking said slide bar against movement relative to said scraper frame.

17. In a material handling apparatus, in combination, a scraper frame movable toward and from the material to be loaded, material penetrating means mounted on said frame and movable with respect thereto for penetrating the material to be loaded and to move and retain the material within the scraper frame, means adapted for actuation by the cables of a haulage mechanism for moving said material penetrating means into and out of material penetrating position with respect to said frame comprising a slide bar guided on said scraper frame for longitudinal movement in a direction lengthwise of said frame and actuating means operatively connected to said material penetrating means and actuated by said slide bar, and resilient stop means on said slide bar for limiting movement of said slide bar when said material penetrating means is moved into either its material penetrating or its material retaining position.

18. In a material handling apparatus, in combination, a portable storage receptacle, a portable slide, a portable guide extending between said receptacle and said slide providing a guideway, said receptacle, slide and guide mounted on bottom skids for sliding movement over a mine floor, and a transfer scraper guided for movement back and forth along said guideway for moving the material from said receptacle onto said slide.

19. In a material handling apparatus, in combination, a portable storage receptacle, a portable slide, a portable guide extending between said receptacle and said slide providing a guideway, said receptacle, slide and guide mounted on bottom skids for sliding movement over a mine floor, a transfer scraper guided for movement back and forth along said guideway for moving the material from said receptacle onto said slide, and a haulage mechanism mounted on said slide and having cable winding drums and cooperating drag line cables operatively connected to said transfer scraper, and guides carried by said receptacle and said slide for guiding said cables relative to the drums of said haulage mechanism and said transfer scraper.

20. In a material handling apparatus, in combination, a portable storage receptacle, a portable slide, a portable guide extending between said receptacle and said slide providing a guideway, said receptacle, slide and guide mounted on bottom skids for sliding movement over a mine floor and said guide having a sliding connection with said receptacle, and a transfer scraper guided for movement back and forth along said guideway for moving the material from said receptacle onto said slide.

21. In a material handling apparatus, in combination, a portable storage receptacle, a portable slide, a portable guide extending between said receptacle and slide and providing a guideway, said receptacle and slide mounted on bottom skids for sliding movement over a mine floor and said guide comprising a series of articulated guide pans flexible in a vertical direction and slidable over the mine floor, said pans cooperating to provide said guideway, and a transfer scraper guided for movement back and forth along said guideway for moving the material from said receptacle onto said slide.

JOSEPH F. JOY.